United States Patent
Bolger et al.

(10) Patent No.: US 9,914,416 B2
(45) Date of Patent: Mar. 13, 2018

(54) SYSTEM AND METHOD FOR CLOSING A CONTACTOR ON EARLY WAKE TO IMPROVE VEHICLE START TIME

(71) Applicant: FORD GLOBAL TECHNOLOGIES, LLC, Dearborn, MI (US)

(72) Inventors: Bryan Bolger, Canton, MI (US); Ryan J. Skaff, Farmington Hills, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 579 days.

(21) Appl. No.: 14/230,016

(22) Filed: Mar. 31, 2014

(65) Prior Publication Data

US 2015/0274098 A1    Oct. 1, 2015

(51) Int. Cl.
| | |
|---|---|
| *B60R 16/033* | (2006.01) |
| *B60W 20/00* | (2016.01) |
| *B60L 3/00* | (2006.01) |
| *B60L 11/12* | (2006.01) |
| *B60L 11/14* | (2006.01) |

(52) U.S. Cl.
CPC .......... *B60R 16/033* (2013.01); *B60L 3/0092* (2013.01); *B60L 11/123* (2013.01); *B60L 11/14* (2013.01); *B60W 20/00* (2013.01); *B60L 2260/26* (2013.01); *Y02T 10/6217* (2013.01); *Y02T 10/7005* (2013.01); *Y02T 10/7077* (2013.01)

(58) Field of Classification Search
CPC .................................................. B60R 16/033
See application file for complete search history.

(56) References Cited

U.S. PATENT DOCUMENTS

| | | | |
|---|---|---|---|
| 7,479,711 B2 | 1/2009 | MacK | |
| 7,521,824 B2 | 4/2009 | Osawa | |
| 8,169,104 B2* | 5/2012 | Cunningham | B60L 3/04 307/10.1 |
| 2011/0153140 A1* | 6/2011 | Datta | B60R 16/02 701/31.4 |
| 2011/0231034 A1* | 9/2011 | Kinser | B60K 6/46 701/2 |
| 2013/0193920 A1* | 8/2013 | Dickerhoof | H02J 7/02 320/109 |
| 2014/0021916 A1 | 1/2014 | Bilezikjian et al. | |
| 2014/0232182 A1* | 8/2014 | Kinomura | B60L 11/123 307/10.1 |

FOREIGN PATENT DOCUMENTS

WO     2009001086 A2    12/2008

* cited by examiner

*Primary Examiner* — Jeffrey Shin
(74) *Attorney, Agent, or Firm* — Carlson, Gaskey & Olds

(57) ABSTRACT

A method according to an exemplary aspect of the present disclosure includes, among other things, controlling an electrified vehicle by closing a contactor prior to a key on condition of the electrified vehicle.

18 Claims, 3 Drawing Sheets

SYSTEM AND METHOD FOR CLOSING A CONTACTOR ON EARLY WAKE TO IMPROVE VEHICLE START TIME

TECHNICAL FIELD

This disclosure relates to an electrified vehicle, and more particularly, but not exclusively, to a vehicle system and method for closing a contactor prior to starting the vehicle.

BACKGROUND

Generally, electrified vehicles differ from conventional motor vehicles in that they are selectively driven using one or more battery powered electric machines. Conventional motor vehicles, by contrast, rely exclusively on an internal combustion engine to drive the vehicle. Electrified vehicles may use electric machines instead of, or in addition to, internal combustion engines. The electric machines are typically powered by high voltage batteries.

Electrified vehicles may utilize one or more contactors that isolate energy stored in the high voltage batteries from other vehicle loads. For example, the contactors may act as high voltage relays for switching supply voltages to other high voltage components on the vehicle (e.g., electric machines, A/C compressor, PTC heater, DCDC converter, etc.). The contactors connect the battery to a high voltage bus during normal vehicle operation in order to power the electric machine(s).

SUMMARY

A method according to an exemplary aspect of the present disclosure includes, among other things, controlling an electrified vehicle by closing a contactor prior to a key on condition of the electrified vehicle.

In a further non-limiting embodiment of the foregoing method, the controlling step includes closing the contactor in response to an early wake trigger.

In a further non-limiting embodiment of either of the foregoing methods, the early wake trigger includes applying a brake of the electrified vehicle.

In a further non-limiting embodiment of any of the foregoing methods, the early wake trigger includes positioning a key in an ignition of the electrified vehicle.

In a further non-limiting embodiment of any of the foregoing methods, the early wake trigger includes at least one of unlocking a door of the electrified vehicle, sitting in a seat of the electrified vehicle, detecting a key in proximity to the electrified vehicle, and opening a door of the electrified vehicle.

A method according to another exemplary aspect of the present disclosure includes, among other things, closing a contactor in response to an early wake trigger to reduce a vehicle start time associated with an electrified vehicle.

In a further non-limiting embodiment of the foregoing method, the early wake trigger occurs prior to a key on condition of the electrified vehicle.

In a further non-limiting embodiment of either of the foregoing methods, the early wake trigger includes applying a brake of the electrified vehicle.

In a further non-limiting embodiment of any of the foregoing methods, the early wake trigger includes positioning a key in an ignition of the electrified vehicle.

In a further non-limiting embodiment of any of the foregoing methods, the closing step occurs prior to a key on condition of the electrified vehicle.

In a further non-limiting embodiment of any of the foregoing methods, the method includes awakening various systems of the electrified vehicle prior to the closing step.

In a further non-limiting embodiment of any of the foregoing methods, the method includes communicating a wake-up signal from a first control unit to a second control unit, communicating a command signal from the second control unit to a third control unit and commanding the closing step with the third control unit in response to receiving the command signal.

In a further non-limiting embodiment of any of the foregoing methods, the first control unit is a body control module, the second control unit is a hybrid powertrain control module, and the third control unit is a battery electronic control module.

In a further non-limiting embodiment of any of the foregoing methods, the wake-up signal is communicated in response to sensing the early wake trigger.

In a further non-limiting embodiment of any of the foregoing methods, the method includes opening the contactor if a start request is not received after a threshold amount of time has passed.

A vehicle system according to another exemplary aspect of the present disclosure includes, among other things, a contactor and a control unit configured to close the contactor in response to an early wake trigger.

In a further non-limiting embodiment of the foregoing vehicle system, the contactor is commanded closed to connect a battery to an electric machine over a high voltage bus.

In a further non-limiting embodiment of either of the foregoing vehicle systems, at least one sensor is configured to detect the early wake trigger.

In a further non-limiting embodiment of any of the foregoing vehicle systems, the system includes a second control unit and a third control unit, the second control unit configured to communicate a wake-up signal to the third control unit in response to the early wake trigger.

In a further non-limiting embodiment of any of the foregoing vehicle systems, the third control unit is configured to communicate a command signal for closing the contactor to the control unit in response to receiving the wake-up signal.

The embodiments, examples and alternatives of the preceding paragraphs, the claims, or the following description and drawings, including any of their various aspects or respective individual features, may be taken independently or in any combination. Features described in connection with one embodiment are applicable to all embodiments, unless such features are incompatible.

The various features and advantages of this disclosure will become apparent to those skilled in the art from the following detailed description. The drawings that accompany the detailed description can be briefly described as follows.

DETAILED DESCRIPTION

This disclosure relates to a vehicle system that closes a contactor in response to an early wake trigger to reduce electrified vehicle start times. For example, the contactor may be closed prior to starting the electrified vehicle in response to sensing that a driver has applied the vehicle brakes, positioned a key in an ignition of the vehicle, or in response to any other early wake trigger. Closing the contactors at early wake reduces the amount of time necessary to ready the vehicle to drive.

Figure 1:
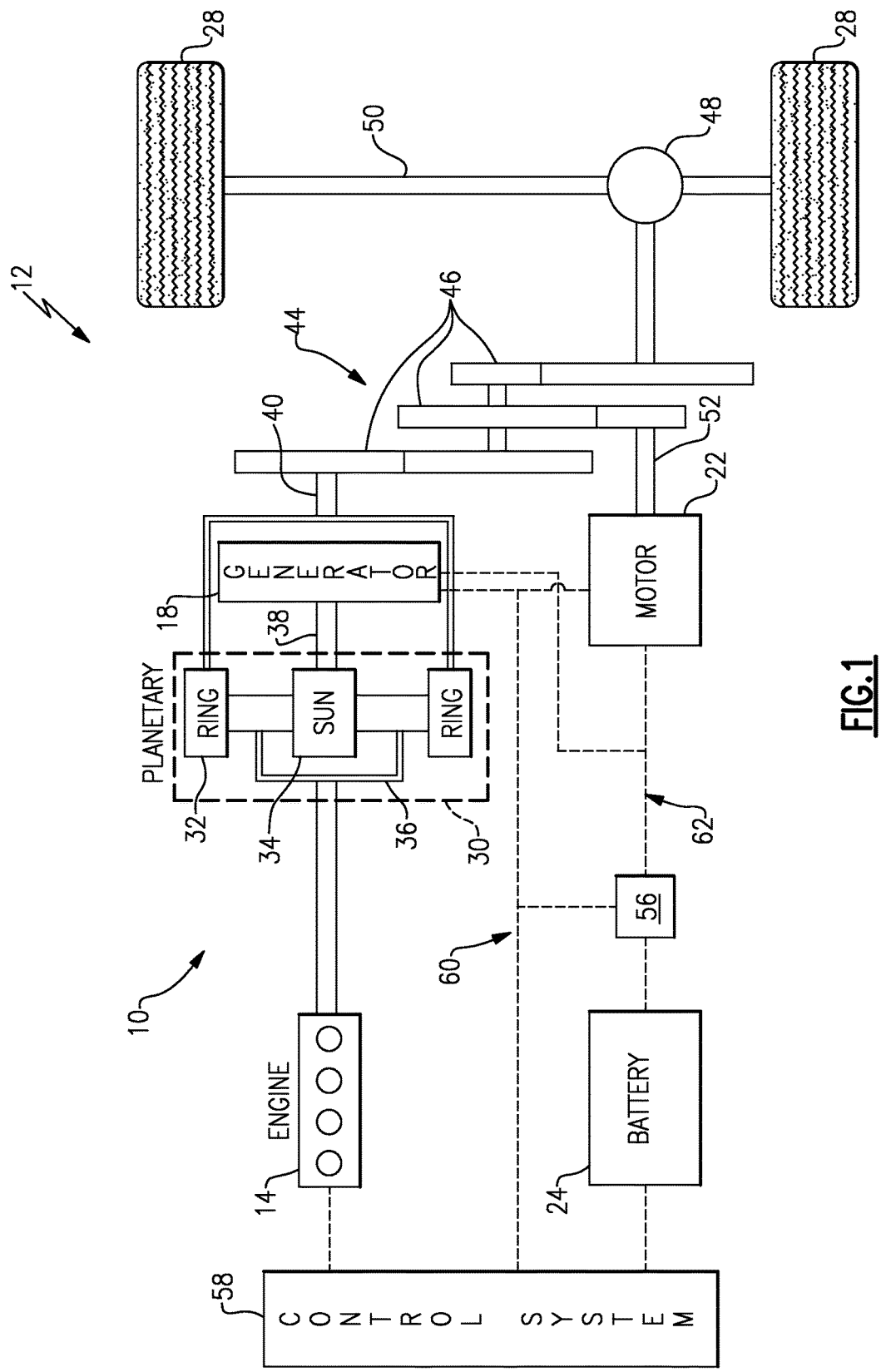
FIG. 1 schematically illustrates a powertrain of an electrified vehicle.

FIG. 1 schematically illustrates a powertrain 10 of an electrified vehicle 12. Although depicted as a hybrid electric vehicle (HEV), it should be understood that the concepts described herein are not limited to HEV's and could extend to other electrified vehicles, including, but not limited to, plug-in hybrid electric vehicles (PHEV's), battery electric vehicles (BEV's), and modular hybrid transmission vehicles.

In one embodiment, the powertrain 10 is a powersplit powertrain system that employs a first drive system and a second drive system. The first drive system includes a combination of an engine 14 and a generator 18 (i.e., a first electric machine). The second drive system includes at least a motor 22 (i.e., a second electric machine), the generator 18, and a battery 24. In this embodiment, the second drive system is considered an electric drive system of the powertrain 10. The first and second drive systems generate torque to drive one or more sets of vehicle drive wheels 28 of the electrified vehicle 12.

The engine 14, which is an internal combustion engine in this embodiment, and the generator 18 may be connected through a power transfer unit 30, such as a planetary gear set. Of course, other types of power transfer units, including other gear sets and transmissions, may be used to connect the engine 14 to the generator 18. In one non-limiting embodiment, the power transfer unit 30 is a planetary gear set that includes a ring gear 32, a sun gear 34, and a carrier assembly 36.

The generator 18 can be driven by the engine 14 through the power transfer unit 30 to convert kinetic energy to electrical energy. The generator 18 can alternatively function as a motor to convert electrical energy into kinetic energy, thereby outputting torque to a shaft 38 connected to the power transfer unit 30. Because the generator 18 is operatively connected to the engine 14, the speed of the engine 14 can be controlled by the generator 18.

The ring gear 32 of the power transfer unit 30 may be connected to a shaft 40, which is connected to vehicle drive wheels 28 through a second power transfer unit 44. The second power transfer unit 44 may include a gear set having a plurality of gears 46. Other power transfer units may also be suitable. The gears 46 transfer torque from the engine 14 to a differential 48 to ultimately provide traction to the vehicle drive wheels 28. The differential 48 may include a plurality of gears that enable the transfer of torque to the vehicle drive wheels 28. In one embodiment, the second power transfer unit 44 is mechanically coupled to an axle 50 through the differential 48 to distribute torque to the vehicle drive wheels 28.

The motor 22 (i.e., the second electric machine) can also be employed to drive the vehicle drive wheels 28 by outputting torque to a shaft 52 that is connected to the second power transfer unit 44. In one embodiment, the motor 22 and the generator 18 cooperate as part of a regenerative braking system in which both the motor 22 and the generator 18 can be employed as motors to output torque. For example, the motor 22 and the generator 18 can each output electrical power to the battery 24.

The battery 24 is one exemplary type of an electrified vehicle battery assembly and may take the form of a high voltage battery that is capable of outputting electrical power to operate the motor 22 and/or the generator 18. Other types of energy storage devices and/or output devices can also be used to supply power within the electrified vehicle 12.

The powertrain 10 may additionally include a control system 58 for monitoring and/or controlling various aspects of the electrified vehicle 12. For example, the control system 58 may communicate with the electric drive system, the power transfer units 30, 44 or other components to monitor and/or control the electrified vehicle 12. The control system 58 includes electronics and/or software to perform the necessary control functions for operating the electrified vehicle 12. In one non-limiting embodiment, the control system 58 is a combination vehicle system controller and powertrain control module (VSC/PCM). Although it is shown as a single hardware device, the control system 58 may include multiple controllers in the form of multiple hardware devices, or multiple software controllers within one or more hardware devices.

A controller area network (CAN) 60 allows the control system 58 to communicate with the powertrain 10. For example, the control system 58 may receive signals from the powertrain 10 to indicate whether a transition between shift positions is occurring. The control system 58 may also communicate with a battery control module of the battery 24, or other control devices.

The powertrain 10 may additionally include one or more contactors 56 as part of a contactor assembly that acts as a high voltage relay for switching supply currents that are communicated to the motor 22 and/or the generator 18. The contactors 56 may be selectively moved between an open position and a closed position to disconnect/connect the battery 24 to the motor 22 and/or generator 18, or other loads, over a high voltage bus 62. The contactors 56 are typically closed during a drive cycle of the electrified vehicle 12. Closing the contactors 56 permits electrical power to circulate to and from the battery 24. At the conclusion of the drive cycle, when the powertrain 10 is not operating, the contactors 56 will be opened to disconnect the battery 24 from high voltage components.

In one non-limiting embodiment, the powertrain 10 may employ two contactors 56, one of which is a pre-charge contactor. When commanded to close, the pre-charge contactor closes, then after a predefined charge is reached, the main contactor is closed and the pre-charge contactor opens during normal operation of the electrified vehicle 12. In response to a vehicle key off condition, the contactors open to isolate the battery 24 from the high voltage bus 62.

Figure 2:
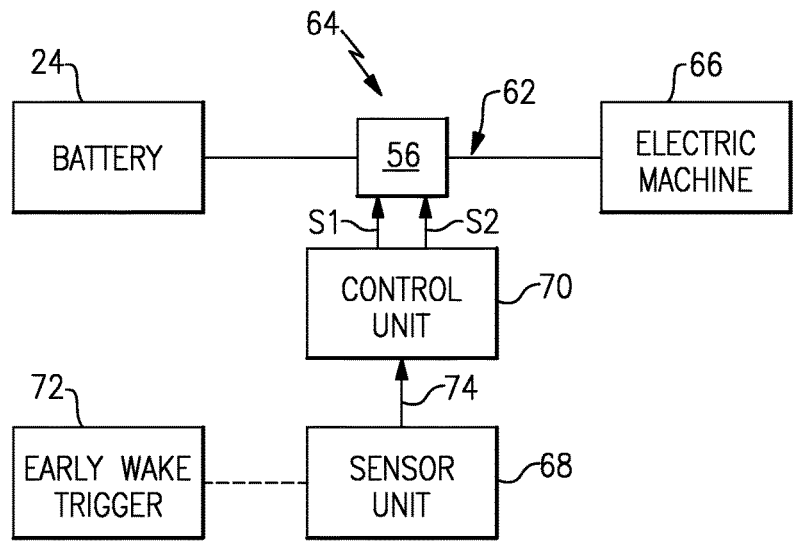
FIG. 2 illustrates a vehicle system of an electrified vehicle.

FIG. 2 illustrates a vehicle system 64 that may be incorporated into an electrified vehicle, such as the electrified vehicle 12 of FIG. 1, in order to reduce start times of the electrified vehicle. The exemplary vehicle system 64 includes a contactor 56 that electrically connects and disconnects a battery 24 from an electric machine 66. Although only a single contactor 56 is shown in FIG. 2, the vehicle system 64 could incorporate any number of contactors within the scope of this disclosure. In one non-limiting embodiment, the vehicle system 64 may close the contractor 56 when the electrified vehicle is off in order to improve vehicle start times.

The vehicle system 64 may additionally include a sensor 68 and a control unit 70. The sensor 68 is adapted to sense an early wake trigger 72. For example, in one non-limiting embodiment, the sensor 68 may sense whether the vehicle operator or driver has applied a brake of the electrified vehicle. In another embodiment, the sensor 68 may detect whether a key has been positioned in an ignition of the electrified vehicle. Additional non-limiting examples of early wake triggers that can be monitored and detected by the sensor 68 include whether a vehicle door has been opened, whether a vehicle key is in relative proximity to the electrified vehicle, whether the electrified vehicle has been unlocked, whether a passenger has seated themselves in a seat of the vehicle, or any other early wake trigger. Generally, the early wake trigger 72 instructs the vehicle system 64 that a driver intends to start the electrified vehicle. Stated another way, the early wake trigger 72 occurs prior to starting the electrified vehicle or while the vehicle is in a key off condition.

The control unit 70 may be part of a vehicle control system, such as the control system 58 of FIG. 1, or could alternatively be a stand-alone control unit. In one embodiment, the control unit 70 is adapted to close the contactor 56 in response to the early wake trigger 72. For example, the sensor 68 may communicate an early wake signal 74 to the control unit 70 when the early wake trigger 72 is sensed. The control unit 70 may then communicate a command signal 51 to the contactor 56 that instructs the contactor 56 to close, such as by closing a relay switch or moving a movable contact into position relative to a stationary contact, thereby allowing high voltage current to flow over the high voltage bus 62 to power the electric machine 66.

In another embodiment, the control unit 70 may communicate another command signal S2 to open the contactor 56 if a start request has not been received after a threshold amount of time has passed since the early wake trigger 72 was sensed. For example, by way of one non-limiting embodiment, the control unit 70 may communicate the command signal S2 to open the contactor 56 if one minute has passed since the early wake trigger 72 and a driver has not attempted to start the electrified vehicle.

Figure 3:
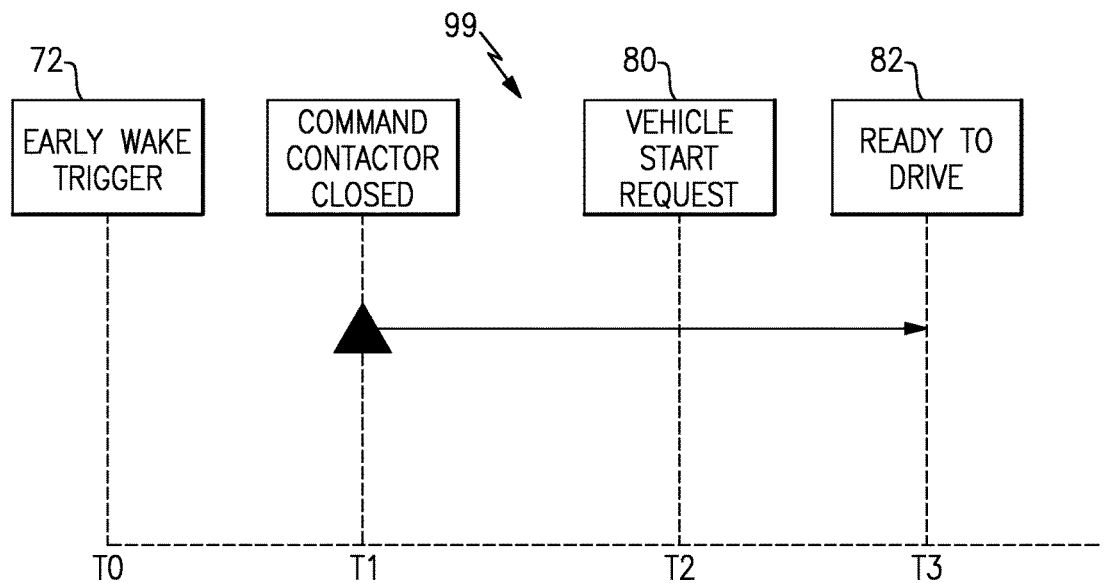
FIG. 3 schematically illustrates an exemplary start-up sequence of an electrified vehicle.

FIG. 3, with continued reference to FIG. 1 and FIG. 2, schematically illustrates an exemplary startup sequence 99 of an electrified vehicle 12 that has been equipped with the vehicle system 64. The exemplary startup sequence 99 may be performed to reduce the start times associated with the electrified vehicle 12.

The startup sequence 99 may begin in response to sensing an early wake trigger 72 at a time T0. Shortly thereafter, after various vehicle startup procedures and sequences have been initiated and performed, the control unit 70 may command the contactor 56 closed (closing indicated by a triangle in FIG. 3) at a time T1. The time T1 occurs before a vehicle start request 80 has been made. The vehicle start request 80 may occur at a time T2.

The electrified vehicle 12 is considered ready to drive 82 at a time T3. The time T3 can occur relatively soon after the vehicle start request 80 has been made by closing the contactor 56 at a period of time prior to starting the electrified vehicle 12 (i.e., at time T1). In one non-limiting embodiment, as little as 66 milliseconds may pass between the times T2 and T3. This is a relatively short amount of time compared to prior art vehicle systems which can require over 400 milliseconds between the times T2 and T3 to ready the electrified vehicle 12 for drive.

Figure 4:
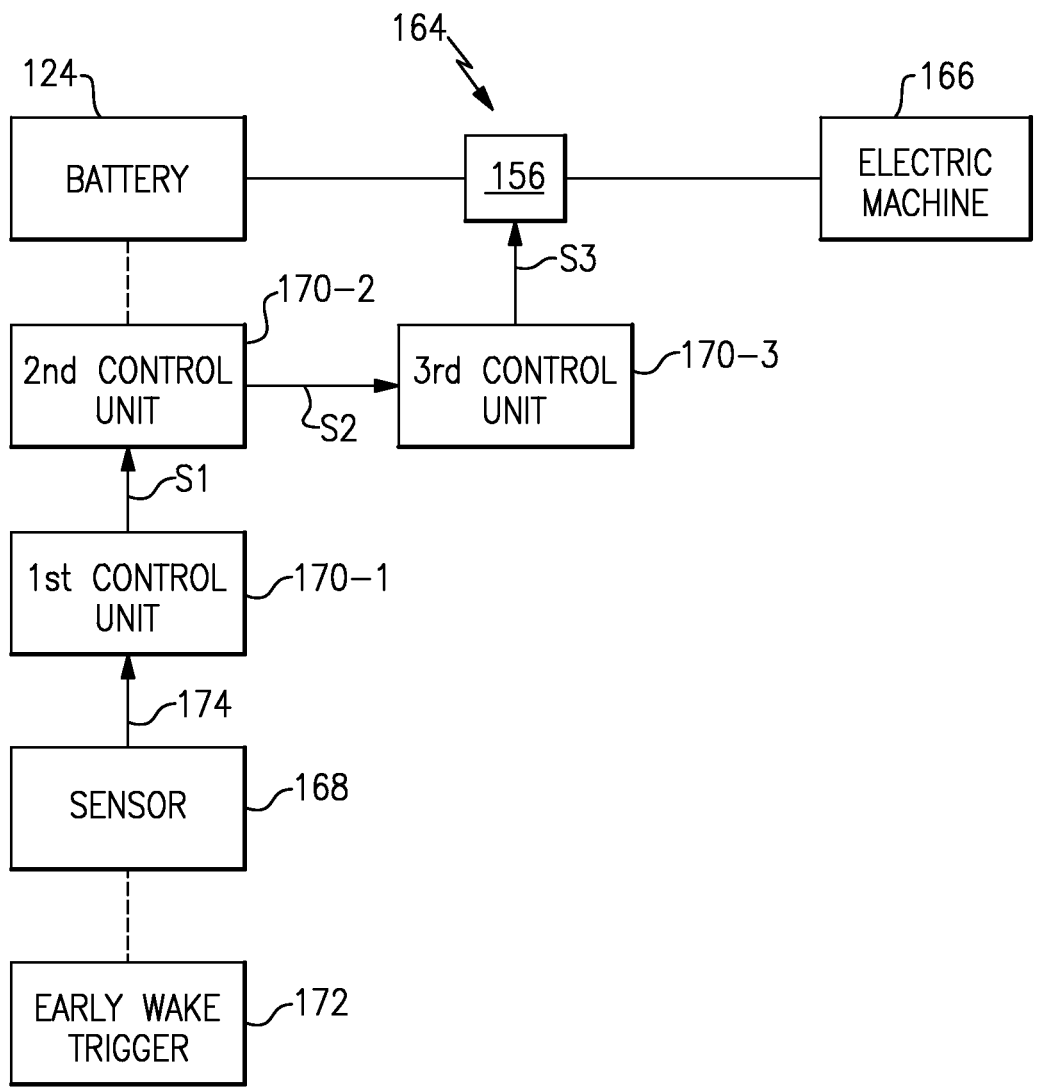
FIG. 4 illustrates a vehicle system according to another embodiment of this disclosure.

FIG. 4 illustrates another exemplary vehicle system 164. In this disclosure, like reference numbers designate like elements where appropriate and reference numerals with the addition of 100 or multiples thereof designate modified elements that are understood to incorporate the same features and benefits of the corresponding original elements.

In this embodiment, the vehicle system 164 includes at least one contactor 156 that selectively connects and disconnects a battery 124 from an electric machine 166. In one non-limiting embodiment, the vehicle system 164 may close the contractor 156 when the electrified vehicle is off in order to improve vehicle start times.

A sensor 168 is adapted to sense an early wake trigger 172. Generally, the early wake trigger 172 instructs the vehicle system 164 that a driver intends to start the electrified vehicle. The early wake trigger 172 occurs prior to starting the electrified vehicle or while the vehicle is in a key off condition.

The vehicle system 164 of this embodiment includes a first control unit 170-1, a second control unit 170-2, and a third control unit 170-3. In one non-limiting embodiment, the first control unit 170-1 is a body control module of the electrified vehicle, the second control unit 170-2 is a powertrain control module and the third control unit 170-3 is a battery electronic control module. Of course, the vehicle system 164 could include other controller arrangements.

In one non-limiting control method, the sensor 168 may communicate an early wake signal 174 to the first control unit 170-1 upon sensing the early wake trigger 172. The first control unit 170-1 may then communicate a wake-up signal S1 to the second control unit 170-2. Once awake, the second control unit 170-2 can communicate a command signal S2 to the third control unit 170-3. Once the third control unit 170-3 receives the command signal S2, it instructs the contactor 56 to close, via another command signal S3, to allow high voltage current to flow over a high voltage bus 162 to power the electric machine 166 or any other load.

Although the different non-limiting embodiments are illustrated as having specific components or steps, the embodiments of this disclosure are not limited to those particular combinations. It is possible to use some of the components or features from any of the non-limiting embodiments in combination with features or components from any of the other non-limiting embodiments.

It should be understood that like reference numerals identify corresponding or similar elements throughout the several drawings. It should be understood that although a particular component arrangement is disclosed and illustrated in these exemplary embodiments, other arrangements could also benefit from the teachings of this disclosure.

The foregoing description shall be interpreted as illustrative and not in any limiting sense. A worker of ordinary skill in the art would understand that certain modifications could come within the scope of this disclosure. For these reasons, the following claims should be studied to determine the true scope and content of this disclosure.

What is claimed is:

1. A method, comprising:
   controlling an electrified vehicle during a key off condition by closing a contactor prior to a vehicle start request of the electrified vehicle, and opening the contactor if the vehicle start request is not received after a threshold amount of time has passed which indicates that a driver has not attempted to start the electrified vehicle.

2. The method as recited in claim 1, wherein the controlling step includes closing the contactor in response to an early wake trigger.

3. The method as recited in claim 2, wherein the early wake trigger includes applying a brake of the electrified vehicle.

4. The method as recited in claim 2, wherein the early wake trigger includes positioning a key in an ignition of the electrified vehicle.

5. The method as recited in claim 2, wherein the early wake trigger includes at least one of unlocking a door of the electrified vehicle, sitting in a seat of the electrified vehicle, detecting a key in proximity to the electrified vehicle, or opening a door of the electrified vehicle.

6. The method as recited in claim 1, wherein the threshold amount of time is one minute.

7. A method, comprising:
closing a contactor in response to an early wake trigger to reduce a vehicle start time associated with an electrified vehicle, the early wake trigger including applying a brake or positioning a key in an ignition of the electrified vehicle prior to a vehicle start request of the electrified vehicle; and
opening the contactor if the vehicle start request is not received after a threshold amount of time has passed.

8. The method as recited in claim 7, wherein the early wake trigger occurs prior to a key on condition of the electrified vehicle.

9. The method as recited in claim 7, comprising awakening various systems of the electrified vehicle prior to the closing step.

10. The method as recited in claim 7, comprising:
communicating a wake-up signal from a first control unit to a second control unit;
communicating a command signal from the second control unit to a third control unit; and
commanding the closing step with the third control unit in response to receiving the command signal.

11. The method as recited in claim 10, wherein the first control unit is a body control module, the second control unit is a hybrid powertrain control module, and the third control unit is a battery electronic control module.

12. The method as recited in claim 10, wherein the wake-up signal is communicated in response to sensing the early wake trigger.

13. A vehicle system, comprising:
a contactor; and
a control unit configured to close said contactor in response to an early wake trigger that occurs prior to a vehicle start request and configured to open said contactor if the vehicle start request is not received after a threshold amount of time has passed, wherein the early wake trigger includes applying a brake or positioning a key in an ignition of an electrified vehicle.

14. The vehicle system as recited in claim 13, wherein said contactor is commanded closed to connect a battery to an electric machine over a high voltage bus.

15. The vehicle system as recited in claim 13, comprising at least one sensor configured to detect said early wake trigger.

16. The vehicle system as recited in claim 13, comprising a second control unit and a third control unit, said second control unit configured to communicate a wake-up signal to said third control unit in response to said early wake trigger.

17. The vehicle system as recited in claim 16, wherein said third control unit is configured to communicate a command signal for closing said contactor to said control unit in response to receiving said wake-up signal.

18. The vehicle system as recited in claim 17, wherein said first control module is a body control module, said second control module is a powertrain control module, and said third control module is a battery electronic control module.

* * * * *